United States Patent [19]

Ohmori et al.

[11] Patent Number: 4,537,872

[45] Date of Patent: Aug. 27, 1985

[54] PROCESS FOR PREPARING A HYDROCARBON REFORMING CATALYST

[75] Inventors: Tadashi Ohmori, Yokohama; Tokuo Fujisó, Yokosuka; Eiji Yasui, Yokohama; Soichi Nomura, Tokyo; Yukio Aizawa, Kawasaki, all of Japan

[73] Assignee: Nippon Oil Company, Limited, Tokyo, Japan

[21] Appl. No.: 602,751

[22] Filed: Apr. 23, 1984

[30] Foreign Application Priority Data

Apr. 28, 1983 [JP] Japan ................................. 58-73842
Dec. 1, 1983 [JP] Japan ............................... 58-225434

[51] Int. Cl.$^3$ ..................... B01J 23/36; B01J 23/42; B01J 27/06
[52] U.S. Cl. .................................................. 502/230
[58] Field of Search ........................................ 502/230

[56] References Cited

U.S. PATENT DOCUMENTS 4,157,989  6/1979  Antos .................................. 502/230
4,176,088  11/1979  Antos .................................. 502/230

Primary Examiner—W. J. Shine
Attorney, Agent, or Firm—Stevens, Davis, Miller & Mosher

[57] ABSTRACT

A hydrocarbon reforming catalyst is obtained by supporting on an inorganic porous carrier a platinum cluster-anion complex salt in an amount of 0.01 to 5 wt. % as platinum metal, a rhenium compound in an amount of 0.01 to 5 wt. % as rhenium metal and a halogen in an amount of 0.2 to 5 wt. %, and then subjecting the resultant catalyst precursor to (a) a thermal decomposition treatment an/or a reduction treatment or alternatively (b) an oxidation treatment and a reduction treatment.

12 Claims, No Drawings

PROCESS FOR PREPARING A HYDROCARBON REFORMING CATALYST

BACKGROUND OF THE INVENTION

The present invention relates to a process for preparing a hydrocarbon reforming catalyst and particularly to a process for preparing an improved catalyst for reforming naphtha fraction to obtain a high-octane gasoline or aromatic hydrocarbons.

More particularly, the present invention is concerned with a process for preparing a platinum-rhenium catalyst to be used for a catalytic reforming naphtha fraction, in which a platinum carbonyl cluster-anion complex salt is used as platinum and a rhenium compound is used as rhenium.

Catalytic reforming reaction is one of important reactions in the petroleum refining and petrochemical industries. The most important reaction in this process is an aromatization reaction, in which are included dehydrogenation or isomerization-dehydrogenation reaction of cycloparaffins and dehydrocyclization reaction of paraffins. There also occur other reactions such as isomerization, hydrocracking and hydrogenolysis. Particularly, hydrocracking and hydrogenolysis reactions produce lower hydrocarbons and reduce the yield of gasoline and that of aromatic hydrocarbons, and therefore it is desirable that the occurrence of these reactions be minimized.

For catalytic reforming, platinum-halogen-alumina catalysts were mainly used during the period between 1950 and 1960, but from the latter half of 1960 those catalyts were replaced by catalysts containing rhenium, iridium or germanium as the second component in addition to platinum, and at present almost all catalytic reforming apparatus are filled with bimetallic catalysts, typical of which is a platinum-rhenium catalyst. For example, in Japanese Patent Publication No. 31859/1970 there is disclosed a reforming process for naphtha fraction using a platinum-rhenium catalyst, in which chloroplatinic acid, ammonium chloroplatinate or polyamine platinum salt is used as the platinum source. And in Japanese Patent Publication No. 29362/1972 there is disclosed a reforming process for naphtha using a platinum-rhenium bimetallic catalyst, in which chloroplatinic acid, ammonium chloroplatinate or polyamine platinum salt is used as the platinum source. According to these processes, the resultant catalysts are superior in oxidation stability, but it is necessary that the feedstock fed to the catalytic reforming process be substantially free from sulfur and go through a desulfurization treatment before reforming. If the sulfur content of the feedstock is 1 ppm or more, the catalyst stability will be lost repidly and the intrinsic performance of the platinum-rhenium catalyst will not be exhibited. For the desulfurization treatment, usually a hydro-refining equipment is used, but considerable expenses are required for the construction and operation of this equipment.

Further, in Journal of Chemical Society Chemical Communication (J.C.S. CHEM. COMM.), 11 (1976) there is disclosed a selective dehydrocyclization reaction of n-hexane which is performed over supported platinum crystals produced from a platinum carbonyl cluster-anion complex salt. The catalyst used therein is prepared by supporting on γ-alumina a platinum carbonyl cluster-anion complex salt of the general formula $[Pt_3(CO)_6]_n^{2-}$ [NEt$_4$]$_2$ (n=2~5) according to an impregnation method. That catalyst exhibits a good stability of its activity even when the sulfur content of the feedstock is 1 ppm or more, but is inferior in catalyst performances such as activity, aromatization selectivity and stability in comparison with a platinum-chlorine-alumina catalyst prepared by a conventional method and having the same platinum content and a commercially available platinum-chlorine-alumina catalyst. As to the activity, selectivity and stability used herein, (1) the activity means a measure of conversion of starting hydrocarbons into products under specific reaction conditions, (2) the selectivity means the amount of a specific product relative to converted starting hydrocarbons and (3) the stability means a rate of change relative to time of the activity and selectivity or of a value (yield) obtained by multiplying the two; the smaller this rate, the better the stability. The above catalyst is inferior also in its stability against oxidation.

SUMMARY OF THE INVENTION

It is an object of the present invention to provide a process for preparing a hydrocarbon reforming catalyst superior in the foregoing catalyst performances and stability against oxidation.

It is another object of the present invention to provide a process for preparing a catalyst capable of exhibiting remarkably improved catalyst performances in a naphtha reforming reaction.

The present invention resides in a process for preparing a hydrocarbon reforming catalyst, characterized in utilizing as a precursor a rhenium compound and a platinum carbonyl cluster complex salt of the general formula $$[P+_3(CO)_6]_n^{2-} \cdot 2M^+$$

wherein n is an integer of 1-5, M$^+$ is a cation selected from the group consisting of Li$^+$, Na$^+$, K$^+$, Rb$^+$, Cs$^+$, NH$_4$ or quaternary alkyl amine cation and supporting on an inorganic porous carrier the platinum carbonyl cluster complex salt in an amount of 0.01 to 5 wt. % as platinum metal, and the rhenium compound in an amount of 0.01 to 5 wt. % as rhenium metal and a halogen in an amount of 0.2 to 5 wt. %, and then subjecting the resultant catalyst precursor to either (a) a thermal decomposition treatment and/or a reduction treatment or alternatively (b) an oxidation treatment and a reduction treatment.

DESCRIPTION OF THE PREFERRED EMBODIMENTS

The inorganic porous carrier used in the present invention is a refractory, porous, inorganic oxide, which is synthetic or natural oxide or a combination of both. Preferably, it has a specific surface area of 50 to 500 m$^2$/g. Examples are alumina, silica, titania, zirconia, chromia, beryllia, vanadinia, magnesia, boria, thoria and oxides of rare earth elements, alone or in combination; and crystalline aluminosilicates such as mordenite, faujasite, and hydrogen type or polyvalent cation type zeolites, e.g. ZSM zeolites; as well as spinel type compounds such as MgAl$_2$O$_4$, FeAl$_2$O$_4$, CaAl$_2$O$_4$, and composites thereof. Among these inorganic oxides, alumina is preferred. All aluminas called activated alumina are employable, but γ- and η-type aluminas are particularly preferred. These aluminas may contain small amounts of other inorganic oxides such as silica, magnesia, zirconia and titania.

The process for preparing alumina is not specially limited, but a process which affords alumina having a reduced content—particularly not higher than 0.1 wt. %—of alkali metal oxides, especially Na₂O and K₂O, is preferred. For example, a high purity aluminum metal is melted with an acid and then neutralized with ammonia or urea to obtain a hydroxide, or an aluminum alcoholate by-produced from the Ziegler's higher alcohol (Alfol) process is hydrolyzed to obtain a hydroxide, and the hydroxide thus obtained is calcined to obtain γ- or η-alumina, which is preferred.

As to the shape of the carrier, it is not specially limited. It may be a desired size of an extrudate, tablet, bead, or granule. Preferable properties of the carrier involve a surface area of 50 to 500 m²/g, an apparent density of 0.3 to 0.8 g/cm³, a pore volume of 0.2 to 1.1 ml/g and a mean pore radius of 50 to 300 Å.

Platinum carbonyl complex salt is known in the art and can be defined, for example, by the formula $$[Pt_3(CO)_6]_n{}^{2-}\cdot 2M^+$$

wherein n is an integer of 1–5, M⁺ is a cation such as Li⁺, Na⁺, K⁺, Rb⁺, Cs⁺, NH₄ or quaternary alkyl amine cation.

As the platinum carbonyl cluster complex salt used in the present invention there may be used, for example, a platinum carbonyl cluster complex salt of the general formula $[Pt_3(CO)_6]_n$ [NEt₄]₂ (n=2~5) prepared by treating chloroplatinic acid in a solution of sodium hydroxide in methanol at room temperature under carbon monoxide according to the process described in Journal of American Chemical Society (J.A.C.S.), 98, 7225 (1976). The n in the above formula can be changed freely by adjusting the amount of sodium hydroxide added, but a value of n in the range of 3 to 5 is most preferred in the present invention. Suitable examples of platinum carbonyl cluster complexes which may be used in the present invention further include Pt₃(CO)₃(PPh₃)₄ and [Pt₄(CO)₅(PPh₃)₄, which are described in Journal of Chemical Society (A) [J.C.S. (A)], 1538 (1970); [Pt₁₉(CO)₂₂][NBu₄]₂ which is described in J.A.C.S., 101, 6110 (1979); [Pt₉(CO)₁₈][NBu₄]₂ which is described in J.C.S. CHEM. COMM., 309 (1977); and Pt₅(CO)₆L₄ (L=P(C₂H₅)₃, PPh₃) which is described in Journal of Organometallic Chemistry (J. Organometal. Chem.), 136, 375 (1977). Above all, $[Pt_3(CO)_6]_n$[NEt₄]₂ (n=3~5) is preferred.

Examples of the rhenium compound used in the present invention include both inorganic and organic rhenium compounds. Preferred examples of inorganic rhenium compounds are perrhenic acid, perrhenates, rhenium oxides, rhenium halides and rhenium oxyhalides. Examples of organic rhenium compounds are various rhenium complexes; above all, alkyl, aryl, carbonyl and oxo complexes are preferred, with carbonyl complexes being particularly preferred.

As examples of rhenium carbonyl complexes which may be used in the invention, there may be mentioned, in addition to such generally known complexes as Re₂(CO)₁₀ and Re(CO)₅L (L=halogen, CH₃, C₂H₅, H) [NEt][H₂Re(CO)₄], [Re₄(CO)₁₆]M₂ (M=NEt₂, NBu₂) compounds which are described in J.A.C.S., 89, 6374 (1967); such various rhenium carbonyl cluster-anion complex salts as described in J. Organometal. Chem., 96, 259 (1975) and ibid., 158, 199 (1978); and such various rhenium carbonyl hydride complexes as described in J.A.C.S., 94, 6232 (1972) and J.A.C.S., 86, 4841 (1964).

In preparing the catalyst according to the process of the present invention, the rhenium compound may be supported on the carrier before, after, or simultaneously with the supporting of platinum on the carrier. In the case of supporting the rhenium compound before platinum on the carrier, it is preferable that the rhenium on the carrier be treated into the state of oxide or metal before supporting the platinum carbonyl cluster complex salt on the carrier. In the case of supporting rhenium after platinum on the carrier, it is preferable that the platinum on the carrier be exposed on the carrier by thermal decomposition and/or hydrogen treatment. Further, in the case of supporting both platinum and rhenium at a time, it is preferable to use a homogeneous solution of the platinum carbonyl cluster complex salt and the rhenium compound. In this case, it is necessary that the solvent and rhenium compound to be used be selected so as not to impair the stability of the platinum carbonyl cluster complex salt.

Since the platinum carbonyl cluster complex salt is sensitive to oxygen in the catalyst preparation stage, it is important in the catalyst preparing process of the present invention to avoid such conditions as cause oxidation or change in quality of part or the whole of the platinum carbonyl cluster complex salt in the step of supporting it on the carrier.

According to the most preferable supporting method, there is used a homogeneous solution of the platinum carbonyl cluster complex salt and the rhenium compound which is preferably a rhenium carbonyl compound. And preferably, there is adopted an impregnation method using a suitable solution containing the platinum carbonyl cluster complex salt and/or the rhenium compound. There also may be adopted an adsorption method and an ion exchange method. Further, as the rhenium compound supporting method, a vacuum evaporation method using a sublimable compound is also preferable.

Solvents which may be used in the catalyst preparing process of the present invention are not specially limited if only they can dissolve well and do not change the quality of the platinum carbonyl cluster complex salt and the rhenium compound. Water is a solvent suitable for water-soluble rhenium compounds, but not desirable for the platinum carbonyl cluster complex salt from the standpoint of solubility. Organic solvents are preferred in the present invention. Preferred examples are ketones, ethers, alcohols, aldehydes, paraffins, naphthenes and aromatic hydrocarbons, with acetone and tetrahydrofuran being most preferred. It is important that the solvent be separated and removed from the catalyst after the impregnation treatment with the solution containing the platinum carbonyl cluster complex salt alone or in combination with the rhenium compound. This is effected by decantation and/or evaporation method. It is desirable that the evaporation method be applied at a temperature in the range of room temperature to 150° C. for one hour or more under an inert gas stream or under vacuum.

The dry matter (catalyst precursor) comprising the platinum carbonyl cluster complex salt alone or both this complex salt and the rhenium compound supported on the carrier is then subjected to a thermal decomposition treatment and/or a reduction treatment, or alternatively to an oxidation treatment and a reduction treatment. Preferably, the thermal decomposition treatment is performed under an inert gas stream, hydrogen gas stream, oxidizing atmosphere, or in vacuo. In the case where the platinum carbonyl cluster complex salt alone is supported or the rhenium compound is supported in advance on the carrier, the thermal decomposition treatment is conducted at a temperature not lower than the decomposition temperature of the platinum carbonyl cluster complex salt, usually in the range of 50° to 350° C., preferably 100° to 250° C. Where the platinum carbonyl cluster complex salt and the rhenium compound are simultaneously supported on the carrier, there is used a temperature higher than the decomposition temperature of the compound more difficult to decompose, and when the rhenium compound is supported after platinum on the carrier, there is used a temperature higher than its decomposition temperature, but where the temperature used is higher than 500° C., it will exert a bad influence on the catalyst performances, so it must not exceed 500° C. Temperatures not higher than 400° C. are preferred. The rhenium compound used in the present invention has a decomposition temperature not higher than 500° C., preferably not higher than 400° C.

The reduction treatment is performed by treatment with a substantially water-free hydrogen or hydrogen-containing gas at a temperature in the range of 50° to 550° C., preferably 100° to 500° C.

If either the thermal decomposition treatment or the reduction treatment is applied, the desired object will be attained, but more preferably both the thermal decomposition treatment and the reduction treatment are applied in this order.

Alternatively, both an oxidation treatment and a reduction treatment are applied in this order. The oxidation treatment is performed by treating the catalyst precursor with an oxygen-containing fluid, which is preferably air, at a temperature preferably in the range of 450° to 600° C., more preferably 480° to 550° C., for preferably 2 to 10 hours, more preferably 3 to 5 hours. Conditions for the reduction treatment which follows the oxidation treatment are the same as in the reduction treatment previously described. The oxidation treatment may be preceded by a thermal decomposition treatment, if necessary. Conditions for this thermal decomposition treatment are also the same as in the thermal decomposition treatment previously described.

The catalyst precursor which has gone through the thermal decomposition treatment and/or reduction treatment, or the oxidation and reduction treatments, may be subjected to a sulfiding treatment before its practical use, if necessary. Preferably, this presulfiding operation is performed according to a method commonly adopted by those skilled in the art. For example, the catalyst is treated with a sulfur-containing gas such as hydrogen sulfide or carbon disulfide together with hydrogen. It is also preferable that a sulfur compound be added to naphtha, any other liquid hydrocarbon, recycle gas or hydrogen-containing gas and the catalyst be treated with the resulting mixture. The presulfiding is performed at a temperature usually in the range of 100° to 550° C., preferably 300° to 500° C. The amount of sulfur to be incorporated in the catalyst differs according to supported metals, but preferably it is decided according to the amount of rhenium contained in the catalyst. Preferably, it is in the range of 0.5:1 to 1.5:1 in terms of an atomic ratio of sulfur to rhenium.

In the catalyst thus prepared according to the process of the present invention, the amount of the platinum cluster-anion complex salt and that of the rhenium compound supported on the carrier are each in the range of 0.01 to 5 wt. %, preferably 0.05 to 2.0 wt. %, as platinum or rhenium metal. Preferably, platinum and rhenium are supported in the range of 2/1 to ½ in terms of atomic ratio.

Halogen is an essential component of the catalyst of the present invention. Although it is not always clear in what state halogen is present in the catalyst in use, it has been considered that the presence of halogen has a good effect on the activity and stability of the catalyst as well as the selectivity for the object product and also on the reactivation of the catalyst. Also in the case of the catalyst of the present invention it has been recognized that the addition of halogen brings about a remarkable effect. Halogen may be any one of fluorine, chlorine, iodine and bromine, or a mixture of two or more thereof, preferably fluorine and/or chlorine, with chlorine being particularly preferred. The addition of halogen to the catalyst or its precursor in any manner known to those skilled in the art. That is, halogen may be added during production of the carrier, or either before or after supporting the active components on the carrier. For example, an aqueous solution of hydrogen chloride, ammonium chloride, hydrogen fluoride or ammonium fluoride may be added during preparation of the carrier or impregnated into the carrier. Alternatively, the carrier may be halogenated by a suitable treatment, e.g. vapor phase treatment or impregnation treatment, with an organic halide such as, for example, an organic chloride, an organic fluoride or a substance called freon. The amount of halogen contained in the catalyst is in the range of 0.2 to 5.0 wt. %, preferably 0.5 to 2.0 wt. %, as a total of halogen element(s).

It is preferable that the catalyst prepared according to the process of the present invention be preserved so as to avoid its contact with moisture before its use in reaction. Preferably, it is preserved in a dry atmosphere of an inert gas such as nitrogen or rare gas, or hydrogen gas.

It is preferable that the shape of the catalyst prepared according to the process of the present invention be so selected as to suit the style of reaction in which the catalyst is to be used. For example, in the case of a fixed bed or moving bed type reaction, the catalyst is used in the form of tablet, sphere or spheroid, or as an extrudate, and in the case of a fluid bed type reaction, the catalyst usually is used in a granular or crushed form.

The reforming operation for naphthas usually is carried out using one or more fixed bed or continuous moving bed type reactors. The reactors may be partially charged with the catalyst of the invention and the remainder charged with a conventional reforming catalyst, or alternatively, the reactors may be wholly charged with the catalyst of the invention.

In performing the reforming operation using the catalyst of the present invention, the feedstock to be used preferably comprises a light hydrocarbon oil or oils boiling in the range of 60° to 200° C., examples of which are straight naphtha, thermal cracked naphtha, catalytic cracked naphtha and hydrocracked naphtha, alone or in combination. In treating the feedstock with the catalyst of the present invention, if the water content of the feedstock is not higher than 50 ppm, preferably not higher than 20 ppm, more preferably not higher than 5 ppm, the catalyst performances will be exhibited satisfactorily. The water contained in the feedstock may be removed by a method known to those skilled in the art.

For example, it is removed by adsorption using a solid desiccant (e.g. alumina, silica, silica alumina, zeolite, clay or alkali metal), or by distillation or stripping.

In the reforming operation using the catalyst of the present invention, even if the sulfur content of the naphtha fraction feed is not less than 1 ppm, it will cause no obstacle in practical use, but it is preferable that the sulfur content be reduced to below 1 ppm by hydrofining the feedstock. In this hydrofining treatment there usually is employed a catalyst prepared by supporting any one or composite of such metals as cobalt, nickel, molybdenum and tungsten and their oxides and sulfides on an inorganic carrier prepared from any one or combination of bauxite, active carbon, diatomaceous earth, zeolite, silica, alumina, titania and zirconia.

The naphtha fraction reforming treatment using the catalyst of the present invention may adopt the following conditions: reaction pressure 1–60 atm., reaction temperature 400°–600° C., amount of hydrogen recycled 100–1500 Nm$^3$, LHSV 0.5–5 hr$^{-1}$. However, it has become clear that even if there are used lower pressure and temperature and smaller amount of hydrogen recycled than in the use of conventional platinum-rhenium bimetallic catalysts, or even if the operation is performed at a higher LHSV, the catalyst of the present invention can exhibit superior activity, aromatization selectivity and stability.

Although it is not clear why the superior performances of the catalyst of the invention and the improved oxidation stability thereof based on the addition of rhenium are attained in the reforming reaction of naphtha, the present inventors believe that the following considerations will partially account for its reason. But, it is to be understood that the propriety of the following explanations does not limit the scope of the present invention at all.

In the catalyst prepared according to the process of the present invention, its precursor comprises a halogenated alumina and a platinum cluster structure produced from the platinum carbonyl cluster complex salt and the rhenium compound or rhenium metal both supported on the alumina. If this precursor is subjected to the oxidation treatment under the conditions previously described, the platinum cluster structure and the rhenium compound or rhenium metal are oxidized into metal oxides. In this case, it is presumed that the platinum oxide produced from the platinum cluster structure is restricted its movement on the surface of the alumina by the presence of rhenium and mostly exists on the carrier surface in the constituent units of the platinum cluster structure. Then, upon the subsequent reduction treatment, these platinum oxide units are converted to a group of platinum atoms. It is presumed that the number of platinum atoms in this group is basically close to the number of the constituent units of the platinum cluster structure and that the platinum atom group thus formed exhibits superior characteristics in naphtha reforming reactions, particularly dehydrocyclization reaction of paraffins.

As to the effect of rhenium, it is presumed that the rhenium in the catalyst of the present invention suppresses an excessive dispersion of the platinum oxide, in addition to the various effects of rhenium so far known.

The following examples are given to further illustrate the present invention.

[Preparation of Platinum Carbonyl Cluster Complex Salt]

A platinum carbonyl cluster complex salt was prepared according to the process described in J.A.C.S., 98, 7225 (1976). More specifically, in the case of $Pt_{15}(CO)_{30}2N(C_2H_5)_4$, as an example, 1 g. of chloroplatinic acid was added to 100 cc. of a methanol solution containing 1 g. of sodium hydroxide dissolved therein, and reaction was allowed to take place for 5 hours under a carbon monoxide pressure of 1 atm. in a pressure-resistant glass autoclave having an internal volume of 300 cc., to obtain a transparent solution of deep green color. This solution was reacted with 200 cc. of an aqueous solution containing 2 g. of tetraethylammonium bromide dissolved therein to give a brown precipitate. This precipitate was separated by filtration, then washed thoroughly with water and vacuum-dried to obtain a powdered $Pt_{15}(CO)_{30}.2NEt_4$. The synthesis was carried out using reagents not containing free oxygen and without contact with air.

[Carriers used]

(1) γ-Alumina carrier "CK-300 Alumina" (a product of Akzo Chemie Co.). 1.7 mm dia. by 4.5 mm long extrudate, $Na_2O$: 0.002 wt. %, $SiO_2$: 0.002 wt. %, Specific surface area: 180 m$^2$/g, Pore volume: 0.52 cc/g (2) γ-$Al_2O_3$ carrier "Pural DA-2" (a product of Condea Co.). 1.5 mm dia. by 4–6 mm long extrudate, $Na_2O$: 0.004 wt. %, $SiO_2$: 0.007 wt. %, Specific surface area: 270 m$^2$/g, Pore volume: 0.76 cc/g.

[Halogen Supporting Method]

The above two kinds of alumina carriers were crushed (particle diameters of 30 to 60 mesh) and ach added 10 g. into an aqueous solution containing 0.4 cc. of concentrated hydrochloric acid at room temperature, and allowed to stand for 1 hour, followed by filtration, water-washing, then drying at 150° C. for 2 hours and subsequent calcining in air at 500° C. for 4 hours. The thus-calcined products were used as carriers. In both carriers, the chlorine content was 1.2 wt. %. The halogenated aluminas are used after deaeration for 1 hour at room temperature.

[Catalyst Preparing Method]

Method A: 40 mg. of a platinum carbonyl cluster complex salt ($Pt_{15}(CO)_{30}.2NEt_4$) and 53 mg. of a rhenium compound ($Re_2(CO)_{10}$) were dissolved in 50 cc. of a deoxidized tetrahydrofuran (THF), and then 10 g. of a chlorinated alumina carrier ("CK-300", chlorine 1.2 wt. %) with chlorine supported according to the halogen supporting method was put into the resultant solution. After standing for 3 hours, the solvent is removed by deaeration, followed by drying at 80° C. for 1 hour under a deoxidized and dehydrated nitrogen gas stream. Then, the temperature was raised to 180° C., at which temperature the dried matter was heat-treated for 2 hours under vacuum ($10^{-4}$ mmHg) and then treated at 300° C. for 1 hour under a hydrogen gas stream (190 cc/min). These operations were performed while avoiding contact with air. The catalyst thus prepared will be hereinafter referred to as catalyst A-1.

Method B: The same procedure as in the method A was repeated except that the removal of the solvent was effected not by deaeration but by filtration. The catalyst thereby obtained will be hereinafter referred to as catalyst B-1.

Method C: 40 mg. of a platinum carbonyl cluster complex ($Pt_{15}(CO)_{30}.2NEt_4$) was dissolved in 50 cc. of a deoxidized THF. After supporting platinum in the same way as in the method A, the platinum-supported carrier was put into a solution of 53 mg. of a rhenium compound ($Re_2(CO)_{10}$) in 500 cc. of a deoxidized THF. After standing for 3 hours, the solvent was removed by deaeration, followed by drying at 80° C. for 1 hour under a dry nitrogen gas stream. Then, the dried matter was thermally decomposed at 110° C. for 30 minutes under vacuum and further treated at 300° C. for 1 hour under a hydrogen gas stream (190 cc/min). The catalyst thus prepared will be hereinafter referred to as catalyst C-1.

Method D: The same procedure as in the method C was repeated except that the platinum and rhenium supporting order was reversed, that is, first rhenium and then platinum were supported on the carrier. The catalyst thereby obtained will be hereinafter referred to as catalyst D-1.

Method E: The catalyst A-1 prepared by the method A was treated, after its use in Example 1, at 550° C. under a nitrogen gas stream containing 2 vol. % of oxygen to burn off a carbonaceous deposit until carbon dioxide was no longer detected at the outlet. This regenerated catalyst will be hereinafter referred to as catalyst A-2.

Method F: 40 mg. of a platinum carbonyl cluster complex salt ($Pt_{15}(CO)_{30}.2NEt_4$) and 53 mg. of a rhenium compound ($Re_2(CO)_{10}$) were dissolved in 50 cc. of a deoxidized acetone, and then 10 g. of a chlorinated alumina carrier ("CK-300", chlorine 1.2 wt. %) was put into the resultant solution. After standing for 3 hours, the solvent was removed by deaeration, followed by drying at 80° C. for 1 hour under a deoxidized and dehydrated nitrogen gas stream. Then, the temperature was raised to 180° C., at which temperature the dried matter was heat-treated for 2 hours under vacuum ($10^{-4}$ mmHg). Then, this catalyst precursor was treated at 500° C. for 3 hours under an air stream (200 cc/min) and further subjected to a reduction treatment under a hydrogen gas stream at 480° C. and at atmospheric pressure for 2 hours. The catalyst thus prepared will be hereinafter referred to as catalyst F-1.

Method G: The same procedure as in the method F was repeated except that the removal of the solvent was effected not by deaeration but by filtration. The catalyst thereby obtained will be hereinafter referred to as catalyst G-1.

Method H: 40 mg. of a platinum carbonyl cluster complex ($Pt_{15}(CO)_{30}.2NEt_4$) was dissolved in 50 cc. of a deoxidized acetone. After supporting platinum in the same way as in the method F, the platinum-supported carrier was put into a solution of 53 mg. of a rhenium compound ($Re_2(CO)_{10}$) in 50 cc. of a deoxidized acetone. After standing for 3 hours, the solvent was removed by deaeration, followed by drying at 80° C. for 1 hour under a dried nitrogen gas stream. Then, the dried matter was thermally decomposed at 110° C. under a vacuum of 30 mmHg, then heat treated in air at 500° C. for 5 hours and further subjected to a reduction treatment in a hydrogen gas stream at 480° C. and at atmospheric pressure for 2 hours. The catalyst thus prepared will be hereinafter referred to as catalyst H-1.

Method I: The same procedure as in the method H was repeated except that the platinum and rhenium supporting order was reversed, that is, first rhenium and then platinum were supported on the carrier. The catalyst thus obtained will be hereinafter referred to as catalyst I-1.

Method J: The catalyst F-1 prepared by the method F was treated, after its use in Example 1, at 550° C. under a nitrogen gas stream containing 2 vol. % of oxygen to burn off a carbonaceous deposit until carbon dioxide was no longer detected at the outlet. This regenerated catalyst will be hereinafter referred to as catalyst F-2.

[Comparative Catalyst Preparing Method]—1

A catalyst was prepared according to the method described in J.C.S. CHEM. COMM., 12 (1976). More particularly, 80 mg. of $Pt_{15}(CO)_{30}.2NEt_4$ was dissolved in 50 cc. of a deaerated and dehydrated THF solution, and then 10 g. of an unchlorinated alumina ("CK-300") was added into the resultant solution. After standing for 3 hours at room temperature, the solvent was removed completely by deaeration, then the cluster was thermally decomposed at 180° C. for 2 hours under vacuum ($10^{-4}$ mmHg), followed by further treatment at a raised temperature of 300° C. for 1 hour under a hydrogen gas stream (190 cc/min). The catalyst thus prepared will be hereinafter referred to as catalyst I. The platinum content of the catalyst I was 0.60 wt. %.

[Comparative Catalyst preparing Methods]—2 and 3

A catalyst was prepared in the same way as in the comparative catalyst preparing method-1 except that a chlorinated alumina (chlorine 0.9 wt. %) was used in place of the unchlorinated alumina. This catalyst will be hereinafter referred to as catalyst II. The content of platinum and that of chlorine of this catalyst were 0.62 and 0.9 wt. %, respectively.

The catalyst II was used in a reaction which was carried out under the conditions set forth in Comparative Example 1 for 100 hours, and then treated at a maximum temperature of 550° C. under a nitrogen gas stream containing 2 vol. % of oxygen to burn off a carbonaceous deposit until carbon dioxide was no longer detected at the outlet. This regenerated catalyst will be hereinafter referred to as catalyst III. The content of platinum and that of chlorine of the catalyst III were 0.63 and 0.68 wt. %, respectively.

[Comparative Catalyst Preparing Method]—4

A catalyst was prepared according to a method exemplified in Japanese Patent Publication No. 31859/1970. More particularly, using an impregnating aqueous solution containing 80 mg. chloroplatinic acid, 39 mg. perrhenic acid and 0.42 ml. hydrochloric acid, platinum and rhenium were co-impregnated into 10 g. of an alumina carrier ("CK-300"), followed by drying in air at 80° C. for 12 hours and further at 210° C. for 3 hours. Then, the dried matter was subjected to a reduction treatment in a hydrogen gas stream (6.9 l/min·g·cat) at 500° C. for 2 hours. The catalyst thus prepared will be hereinafter referred to as catalyst IV. The catalyst IV was found to contain 0.31 wt. % platinum, 0.30 wt. % rhenium and 1.0 wt. % chlorine.

[Comparative Catalyst Preparing Method]—5

A catalyst was prepared according to the method described in J.C.S. CHEM. COMM., 11 (1976). More particularly, 80 mg. of $Pt_{15}(CO)_{30}.2N(Et)_4$ was dissolved in 50 cc. of a deaerated and dehydrated acetone, and 10 g. of an unchlorinated alumina ("CK-300") was added into the resultant solution. After standing for 3 hours at room temperature, the solvent was removed completely by deaeration, followed by treatment at 180° C. for 2 hours under vacuum (10⁻⁴ mmHg) and further treatment at 500° C. for 3 hours in an air stream. The catalyst thus prepared will be hereinafter referred to as catalyst V. The platinum content of the catalyst V was 0.6 wt. %.

[Comparative Catalyst Preparing Method]—6

A catalyst was prepared in the same way as in the comparative catalyst preparing method-5. This catalyst will be hereinafter referred to as catalyst VI. The content of platinum and that of chlorine of the catalyst VI were 0.58 and 1.10 wt. %, respectively.

[Comparative Catalyst Preparing Method]—7

A catalyst was prepared according to a method exemplified in Japanese Patent Publication No. 31859/1970. More particularly, using an impregnating aqueous solution containing 80 mg. chloroplatinic acid, 39 mg. perrhenic acid and 0.42 ml. hydrochloric acid, platinum and rhenium were impregnated into 10 g. of an alumina carrier ("CK-300"), followed by drying in air at 80° C. for 12 hours and further at 210° C. for 3 hours. The dried matter was further treated in an air stream at 500° C. and then subjected to a reduction treatment in a hydrogen gas stream at 500° C. for 2 hours. The catalyst thus prepared will be hereinafter referred to as catalyst VII. The catalyst VII was found to contain 0.31 wt. % platinum, 0.30 wt. % rhenium and 1.0 wt. % chlorine.

(1) Where n-heptane was used as a feedstock, reforming reactions were carried out under the following conditions in both the cases of unsulfided and sulfided catalysts: temperature 480° C., total pressure 7 kg/cm²·G, LHSV 2, H₂/n-C₇ mole ratio 2, run time 100 hours.

(2) Where naphtha was used as a feedstock, reforming reactions were performed using sulfided catalysts under the following conditions: temperature 500° C., total pressure 16 kg/cm²·G, LHSV 2, H₂/Oil mole ratio 2, run time 100 hours. The naphtha used was of the following properties: paraffins 67.1 vol. %, naphthenes 18.8 vol. % and aromatics 14.1 vol. %; specifc gravity (¹⁵/4° C.) 0.728; distillation characteristics: IBP 91° C., 10% 102.5° C., 50% 114.5° C., 90% 132° C. and EP 148.5° C.; sulfur content less than 1 ppm. This naphtha fraction was fully dehydrated before use.

EXAMPLES 1–5 and COMPARATIVE EXAMPLES 1–4 n-heptane Reforming Reaction

Using catalysts A-1, B-1, C-1, D-1 and A-2 which had been prepared according to methods (A, B, C, D and E) included in the present invention as well as catalysts I, II, III and IV which had been prepared according to methods not included in the invention, without sulfiding, there were performed reforming reactions of n-heptane under the above reaction conditions (1). Table 1 shows results obtained in 20 hours after start of the reactions.

TABLE 1

Results of n-heptane reforming reactions (without catalyst sulfiding)

| | | Amount of Metal Supported (wt. %) | | Results of Reaction (20 hr) (wt. %) | | | | |
|---|---|---|---|---|---|---|---|---|
| | Catalyst | Pt | Re | n-Heptane Conversion (%) | Yield of Toluene (%) | Yield of Benzene (%) | Yield of Isoheptane (%) | Yield of C₁–C₄ (%) |
| Example 1 | A-1 | 0.32 | 0.29 | 95.8 | 23.3 | 1.3 | 18.9 | 19.2 |
| 2 | B-1 | 0.31 | 0.15 | 96.3 | 24.0 | 1.5 | 19.2 | 18.3 |
| 3 | C-1 | 0.31 | 0.30 | 94.8 | 22.4 | 1.0 | 20.6 | 23.4 |
| 4 | D-1 | 0.30 | 0.30 | 95.2 | 22.8 | 1.1 | 20.2 | 20.6 |
| 5 | A-2 | 0.33 | 0.30 | 95.3 | 23.2 | 1.3 | 19.1 | 19.0 |
| Comparative Example 1 | I | 0.60 | — | 80.3 | 10.6 | 0.7 | 20.3 | 22.4 |
| 2 | II | 0.62 | — | 94.6 | 16.0 | 1.2 | 19.3 | 25.8 |
| 3 | III | 0.63 | — | 97.0 | 11.3 | 0.4 | 24.2 | 32.5 |
| 4 | IV | 0.31 | 0.30 | 91.6 | 18.6 | 0.9 | 24.6 | 19.6 |

[Catalyst Presulfiding Method]

The catalysts which have gone through the reduction treatment are subsequently sulfided if necessary using hydrogen sulfide as a sulfiding agent and a dry hydrogen for 2 hours at 480° C., atmospheric pressure and a gas space velocity of 2100 hr⁻¹, and then pressurized and treated with a dry hydrogen up to the reaction pressure until the hydrogen sulfide concentration at the outlet lowers to below 10 ppm. At this time, the moisture at the outlet also decreases.

[Reaction and Reaction Conditions]

10 cc. of each catalyst crushed to 30–60 mesh and alumina balls each 1 mm in diameter were mixed in equal quantities and the resultant mixture was charged into a stainless steel fixed bed type isothermal reactor having an inside diameter of 12 mm and a length of 480 mm. Hydrogen was used after deoxidation and subsequent dehydration (MS-3A). Feedstocks were deoxidized with a dry nitrogen and subsequently dehydrated, before use.

It is apparent from Table 1 that all of the catalysts prepared according to the process of the present invention are superior in performance to the catalysts of Comparative Examples. For example, the yield of toluene was the lowest in the catalyst I with platinum cluster supported on alumina without chlorine. In the case of catalyst II with platinum cluster supported on chlorinated alumina, its performance fairly improved in comparison with catalyst I, but the use of the regenerated catalyst III resulted in a remarkable increase in amount of decomposition products, a lowered yield of toluene and a great deterioration of performance in an oxidizing atmosphere, although the conversion of n-heptane became higher than that in the use of catalyst II. The catalyst IV prepared by a conventional method (exemplified in Japanese Patent Publication No. 31859/1970) without using cluster was superior in performance to the catalysts I and II, but was inferior to any of the catalysts prepared according to the process of the present invention. It is further apparent from the above table that the catalyst A-2 which has been regenerated from catalyst A-1 in the same manner as in the case of comparative catalyst III is almost equal in performance to catalyst A-1 and its oxidation stability is high.

EXAMPLE 6 and COMPARATIVE EXAMPLE 5 n-Heptane Reforming Reaction

The catalyst A-1 prepared according to the process of the present invention and the comparative catalyst IV were subjected to a sulfiding treatment according to the foregoing catalyst sulfiding method and then used in n-heptane reforming reactions under the foregoing reaction conditions (1). Table 2 shows results obtained in 20 hours after start of the reactions.

TABLE 2

Results of n-heptane reforming reactions (using sulfided catalysts)

| | Catalyst | Amount of Metal Supported (wt. %) | | n-Heptane Conversion (%) | Results of Reaction (20 hr.) (wt. %) | | | |
|---|---|---|---|---|---|---|---|---|
| | | Pt | Re | | Yield of Toluene (%) | Yield of Benzene (%) | Yield of Isoheptane (%) | Yield of $C_1$-$C_4$ (%) |
| Example 6 | A-1 | 0.32 | 0.29 | 96.5 | 35.2 | 0.7 | 14.2 | 23.6 |
| Comparative Example 5 | IV | 0.31 | 0.30 | 94.7 | 30.5 | 0.6 | 20.9 | 20.1 |

TABLE 3

Results of naphtha reforming reactions (using sulfided catalysts)

| | Catalyst | Amount of Metal Supported (wt. %) | | Results of Reaction (50 hr.) (wt. %) | | |
|---|---|---|---|---|---|---|
| | | Pt | Re | Yield of $C_5^+$ | Yield of Aromatics | Yield of $C_1$-$C_4$ |
| Example 8 | C-2 | 0.30 | 0.12 | 76.0 | 58.2 | 24.0 |
| Comparative Example 6 | IV | 0.31 | 0.30 | 77.3 | 52.6 | 22.7 |

In both catalysts subjected to the presulfiding treatment, the yield of toluene in an initial stage lowered (the lowering rate is less in catalyst A-1 than in catalyst IV), but the deterioration in performance in the course of time was suppressed to a remarkable extent and the results obtained in 20 hours after start of the reactions were good. Upon comparison of both catalysts, however, it is seen that the catalyst A-1 is superior in performance.

EXAMPLE 7 n-Heptane Reforming Reaction

Using 40 mg. of $Pt_{15}(CO)_{30}\cdot 2NEt_4$, 39 mg. of $Re_2O_7$ and 10 g. of a chlorinated alumina ("Pural DA-2", chlorine 1.2 wt. %), there was prepared a catalyst (D-2) according to the foregoing method D. The catalyst D-2 was treated according to the foregoing catalyst sulfiding method and then used in n-heptane reforming reaction under the foregoing reaction conditions (1). In this catalyst were contained 0.31 and 0.30 wt. % of platinum and rhenium, respectively. In 20 hours after start of the reaction, the n-heptane conversion was 97.2% and the yields of toluene, benzene, isoheptane and $C_1$-$C_4$ gases were 31.2, 1.5, 19.6 and 25.2 wt. %, respectively.

EXAMPLE 8 and COMPARATIVE EXAMPLE 6

Naphtha Reforming Reaction

Using 40 mg. of $Pt_9(CO)_{18}\cdot 2NEt_4$ and 67.4 mg. of $Re_4(CO)_{16}\cdot 2NBu_4$, there was prepared a catalyst (C-2) according to the foregoing method C. This catalyst and the comparative catalyst IV were sulfided according to the foregoing catalyst sulfiding method and then used in naphtha reforming reaction under the foregoing reaction conditions (2). Table 3 shows obtained in 50 hours after start of the reaction.

Thus, also in the reactions using naphtha, the catalyst prepared according to the process of the present invention was superior in performance.

EXAMPLE 9 and COMPARATIVE EXAMPLE 7

The catalyst B-1 prepared according to the process of the present invention and the comparative catalyst IV were sulfided according to the foregoing catalyst sulfiding method and then used in naphtha reforming reactions under the foregoing reaction conditions (2) in which thiophene was added to naphtha in an amount of 1200 ppm as sulfur. Table 4 shows results obtained in 50 hours after start of the reactions.

TABLE 4

Results of thiophene-added naphtha reforming reactions (using sulfided catalysts)

| | Catalyst | Amount of Metal Supported (wt. %) | | Results of Reaction (50 hr.) (wt. %) | | |
|---|---|---|---|---|---|---|
| | | Pt | Re | Yield of $C_5^+$ | Yield of Aromatics | Yield of $C_1$-$C_4$ |
| Example 9 | B-1 | 0.31 | 0.15 | 78.2 | 52.6 | 21.8 |
| Comparative Example 7 | IV | 0.31 | 0.30 | 80.6 | 32.0 | 19.4 |

In comparison with the comparative catalyst (IV), the catalyst prepared according to the process of the present invention was superior in resistance to sulfur.

EXAMPLES 10–15 and COMPARATIVE EXAMPLES 8–11

The catalysts F-1. G-1, H-1, I-1 and F-2 prepared according to methods (F, G, H and I) included in the present invention and the catalysts, V, VI and VII prepared according to methods not included in the present invention were sulfided according to the foregoing catalyst sulfiding method and then used in n-heptane reforming reactions under the foregoing reaction conditions (1). Table 5 shows results obtained in 100 hours after start of the reactions.

TABLE 5

| Catalyst | Amount of Metal, wt. % | | Results of Reaction, after 100 hrs. | |
|---|---|---|---|---|
| | Pt | Re | n-C7 Conversion, % | Yield of Toluene, % |
| Example 10 F-1 | 0.30 | 0.30 | 92.3 | 24.3 |
| 11 G-1 | 0.30 | 0.30 | 91.8 | 25.3 |
| 12 H-1 | 0.29 | 0.28 | 93.6 | 22.6 |
| 13 I-1 | 0.28 | 0.27 | 91.3 | 21.3 |
| 14 F-2 | 0.30 | 0.28 | 93.2 | 23.8 |
| Comparative Example 8 V | 0.60 | — | 85.2 | 3.3 |
| 9 VI | 0.58 | — | 89.2 | 10.2 |
| 10 VII | 0.31 | — | 92.0 | 15.3 |

It is apparent from Table 5 that all of the catalysts prepared according to the process of the present invention are superior in performance to any of the comparative catalysts. Further, it became clear that the regenerated catalyst F-2 was almost equal in performance to the catalyst F-1, that is, the performances of the catalyst F-1 were little affected by the regeneration treatment.

The catalyst F-1 prepared according to the process of the present invention and the comparative catalyst VII were sulfided according to the foregoing catalyst sulfiding method and then used in naphtha reforming reactions under the foregoing reaction conditions (2). Table 6 shows results obtained in 50 hours after start of the reactions.

TABLE 6

| Catalyst | Amount of Metal, wt. % | | Results of Reaction, after 50 hrs. | |
|---|---|---|---|---|
| | Pt | Re | Yield of $C_5^+$, wt. % | Yield of Aromatics, wt. % |
| Example 15 F-1 | 0.30 | 0.30 | 78.5 | 62.5 |
| Comparative Example 11 VII | 0.31 | 0.30 | 80.8 | 53.6 |

Thus, also in the reactions using naphtha, the catalyst prepared according to the process of the present invention was superior in performance.

What is claimed is:

1. A process for preparing a hydrocarbon reforming catalyst, utilizing as a precursor a rhenium compound and platinum carbonyl cluster complex salt of the general formula $$[Pt_3(CO)_6]_n{}^{2-} \cdot 2M^+$$

wherein n is an integer of 1-5, M+ is a cation selected from the group consisting of Li+, Na+, K+, Rb+, Cs+, NH4 or quaternary alkyl amine cation; which process comprises supporting on an inorganic porous carrier the platinum carbonyl cluster complex salt in an amount of 0.01 to 5% by weight as platinum metal, and the rhenium compound in an amount of 0.01 to 5% by weight as rhenium metal and a halogen in an amount of 0.2 to 5% by weight, and then subjecting the resultant catalyst precursor to a thermal decomposition treatment and a reduction treatment.

2. The process of claim 1 wherein said rhenium compound is a rhenium carbonyl compound.

3. The process of claim 1 wherein said halogen is fluorine or chlorine.

4. The process of claim 1 wherein the thermal decomposition treatment and the reduction treatment are performed in this order.

5. The process of claim 1 wherein the reduction treatment is performed by heating to a temperature in the range of 50° to 500° C. in the presence of hydrogen gas under a substantially anhydrous condition.

6. The process of claim 1 wherein said thermal decomposition treatment is performed by heating to a temperature no higher than 500° C. in an oxidizing atmosphere.

7. The process of claim 1 wherein said thermal decomposition treatment is performed by heating to a temperature in the range of 50° to 500° C. in the presence of inert gas or in vacuum.

8. A process for preparing a hydrocarbon reforming catalyst, utilizing as a precursor a rhenium compound and platinum carbonyl cluster complex salt of the general formula $$[Pt_3(CO)_6]_n{}^{2-} \cdot 2M^+$$

wherein n is an integer of 1-5, M+ is a cation selected from the group consisting of Li+, Na+, K+, Rb+, Cs+, NH4 or quaternary alkyl amine cation; which process comprises supporting on an inorganic porous carrier the platinum carbonyl cluster complex salt in an amount of 0.01 to 5% by weight as platinum metal, and the rhenium compound in an amount of 0.01 to 5% by weight as rhenium metal and a halogen in an amount of 0.2 to 5% by weight, and then subjecting the resultant catalyst precursor to an oxidation treatment and then a reduction treatment.

9. The process of claim 8, wherein said rhenium compound is a rhenium carbonyl compound.

10. The process of claim 8, wherein said halogen is fluorine or chlorine.

11. The process of claim 8, wherein the reduction treatment is performed by heating to a temperature in the range of 50° to 550° C. in the presence of hydrogen gas under a substantially anhydrous condition.

12. The process of claim 8, wherein said oxidation treatment is performed by heating to a temperature in the range of 450° to 600° C. in air.

* * * * *